United States Patent [19]

Han et al.

[11] Patent Number: 4,715,190

[45] Date of Patent: Dec. 29, 1987

[54] CONTROL AND METHOD FOR MODULATING THE CAPACITY OF A TEMPERATURE CONDITIONING SYSTEM

[75] Inventors: Doyoung Han, North Syracuse, N.Y.; Merle A. Renaud, Onalaska, Wis.

[73] Assignee: American Standard Inc., New York, N.Y.

[21] Appl. No.: 13,110

[22] Filed: Feb. 10, 1987

Related U.S. Application Data

[62] Division of Ser. No. 800,426, Nov. 21, 1985, Pat. No. 4,689,967.

[51] Int. Cl.$^4$ .......................... F25D 17/02; F25B 1/00
[52] U.S. Cl. ........................................ 62/201; 62/217; 62/230; 62/228.3
[58] Field of Search ...................... 62/227, 226, 228.1, 62/228.3, 228.4, 228.5, 230, 201, 217, 126, 129, 215, 196.2, 196.3; 236/1 EA; 361/22, 23, 24, 31

[56] References Cited

U.S. PATENT DOCUMENTS 4,356,961 11/1982 Smith .............................. 236/1 EA
4,539,820 9/1985 Zinsmeyer ............................ 62/201
4,562,531 12/1985 Enterline et al. .................. 62/201 X
4,608,833 9/1986 Kountz ............................. 62/228.1

Primary Examiner—Harry B. Tanner
Attorney, Agent, or Firm—William J. Beres; Robert J. Harter; Carl M. Lewis

[57] ABSTRACT

A control and method for varying the capacity of a centrifugal chiller system used to cool a liquid to a setpoint temperature. The control permits the user to select the setpoint, the control gain, and two variables that determine a first deadband and a second relatively wider deadband about the setpoint. If the absolute value of the difference (error) between the actual fluid temperature and the septoint is increasing, the control uses the first deadband, and conversely, if the error is decreasing, it uses the second deadband to vary chiller capacity. The control also permits the user to select a limit for various operating parameters associated with protective shutdown of the system to avoid catastrophic failure, and adjusts the chiller capacity according to one of two predefined functions of the deviation of the operating parameter from its limit, dependent on whether that deviation is greater or less than a predefined deadband.

20 Claims, 12 Drawing Figures

CONTROL AND METHOD FOR MODULATING THE CAPACITY OF A TEMPERATURE CONDITIONING SYSTEM

DESCRIPTION

1. Technical Field

This is a division of application Ser. No. 800,426 filed Nov. 21, 1985, U.S. Pat. No. 4,689,967.

This invention generally pertains to a capacity control for a temperature conditioning system and specifically to a control that varies capacity of the system to maintain a conditioned fluid at a setpoint temperature, and further, to a control that modulates capacity as an operating parameter approaches a limit which would cause system shutdown.

2. Background Art

Systems for heating or cooling a fluid to a setpoint temperature are well known in the prior art, both in process applications and in conditioning a comfort zone. Such systems typically include a control that energizes the system if the fluid temperature deviates from the setpoint by more than a predefined first increment in one direction, and de-energizes the system if the deviation exceeds a predefined second increment in the opposite direction. The combined magnitude of these increments defines the control "deadband," i.e., a range of deviation of the fluid temperature from setpoint, usually centered around the setpoint, within which the control does not change system capacity (by turning the system on or off) in reaction to the fluid temperature error.

Larger temperature conditioning systems often have variable capacity to handle changing load conditions more efficiently. The capacity of a refrigerant compressor in such a system may be modulated using either a plurality of stages that may be selectively unloaded or de-energized, a variable speed compressor, or in the case of most systems using centrifugal compressors, by adjustng inlet guide vanes on the compressor. Control of a variable capacity system to maintain a fluid at a setpoint temperature is, of course, more complex than the simple on/off approach discussed above, however, a typical control for a variable capacity system still must include a deadband around the setpoint for control stability. The control deadband is usually selected with care. A wider deadband avoids too frequent changes in compressor capacity, while a narrower deadband provides more accurate control of the fluid temperature at the setpoint.

Selecting the width of the deadband is usually a compromise between accurate temperature control and stable operation of the system. The designer tries to avoid continually cycling a stage on and off or otherwise adjusting capacity to maintain the temperature of the fluid at the setpoint. Furthermore, he does not want the system to overshoot the setpoint as the load changes. These problems are addressed in U.S. Pat. No. 4,356,961, wherein dual deadbands are used in the control of a system having a plurality of heating and cooling stages.

The U.S. Pat. No. 4,356,961 discloses a microprocessor control in which a first narrow deadband is used to control the on/off state of whichever stage is presently cycling. Once the controlled temperature exceeds the range of a second wider deadband, the next stage (or preceding stage) is controlled to maintain the temperature within the range of the first deadband. Control of the stages within one or the other deadband is independent of whether the deviation from setpoint is increasing or decreasing, but instead depends only on the magnitude of the deviation. Thus, the second deadband essentially just defines a temperature error at which point the next stage should be energized or the preceding stage d-energized. This method does not appear to really solve the problem of minimizing setpoint overshoot while reducing cycling of the stages.

Almost every temperature conditioning system has some form of protection to prevent catastrophic failure in the event an operating parameter exceeds a safe limit, e.g., a circuit breaker to protect a compressor drive motor against damage resulting from an overload condition. On large systems, several limit switches are usually provided to shut down the system if various operating parameters exceed a safe limit. Unless there is an automatic reset, the system stays off until manually reset by an operator. Under certain load conditions, it is much more likely that an operating parameter will exceed a limit, causing the system to shut down. This can be particularly troublesome, if for example, on a very hot day when needed the most, an air conditioning system shuts down due to overload. Conversely, a problem can also occur when the system is lightly loaded and the outdoor ambient temperature is relatively cool, since under these conditions, the evaporator refrigerant temperature may drop very quickly once the system is energized, causing an evaporator refrigerant limit switch to trip to prevent the liquid being chilled in the evaporator from freezing. In both cases, the system normally shuts down and is not available for cooling until the problem is corrected and the limit switch is reset. Conventional controls modulate system capacity only to achieve and maintain the conditioned fluid at the setpoint temperature; they do not modulate capacity to avoid tripping a limit switch. On very hot days when the load exceeds the system's capacity, it is clearly more desirable to continue to operate the system to provide whatever cooling is possible than to allow an operating parameter to degrade to the point where a limit switch de-energizes the system to prevent damage.

It is therefore an object of this invention to provide a control that maintains a fluid near the setpoint temperature, yet minimizes capacity modulation.

It is a further object of this invention to provide a control that achieves the setpoint with minimal overshoot.

A still further object is to achieve the setpoint as rapidly as possible without tripping a limit switch that protects the system from catastrophic failure.

Yet a further object is to modulate system capacity to prevent an operating parameter from exceeding a safe limit, even if the setpoint temperature is not achieved by the system.

These and other objects of the invention will be apparent from the drawings and the description of the invention that follows herein below.

SUMMARY OF THE INVENTION

The invention is a capacity control for a system used to condition a fluid to a predetermined setpoint temperature and a method of controlling the capacity of such a system. The system includes a temperature sensor responsive to the temperature of the conditioned fluid and means for selecting a first variable used for determining the widths of a first deadband and a second relatively wider deadband. It also includes means for selecting a second variable that defines a gain setting for the control.

Control means are connected to and are responsive to the temperature sensor and the first and second variable selecting means. The control means are operative to determine the width of the first and second deadbands as a function of the first variable. Capacity of the system is modulated by the control means to maintain the temperature of the conditioned fluid near the setpoint as a function of the gain setting. In addition, the control means determine the deviation of the fluid from the setpoint. If the absolute value of the deviation is increasing, the control means use the first deadband, and if the value is decreasing, use the second deadband in modulating capacity.

A further feature of the invention is a control and method for modulating the capacity of the system when an operating parameter is near a limit associated with protective shutdown of the system. The shutdown would normally occur to avoid a catastrophic failure of the system if the operating parameter exceeds the limit. The control includes means for sensing the condition of the operating parameter and means for selecting its limit. Control means, responsive to the sensing and selecting means, determine the deviation of the operating parameter from its limit and modulate the capacity of the system according to a first predefined function of the deviation if the deviation is greater than a deadband, and according to a second predefined function of the deviation if the deviation is less than the deadband. Operating parameters that use the control method include evaporator refrigerant temperature, condenser pressure, and line current.

DESCRIPTION OF THE PREFERRED EMBODIMENT

Figure 1:
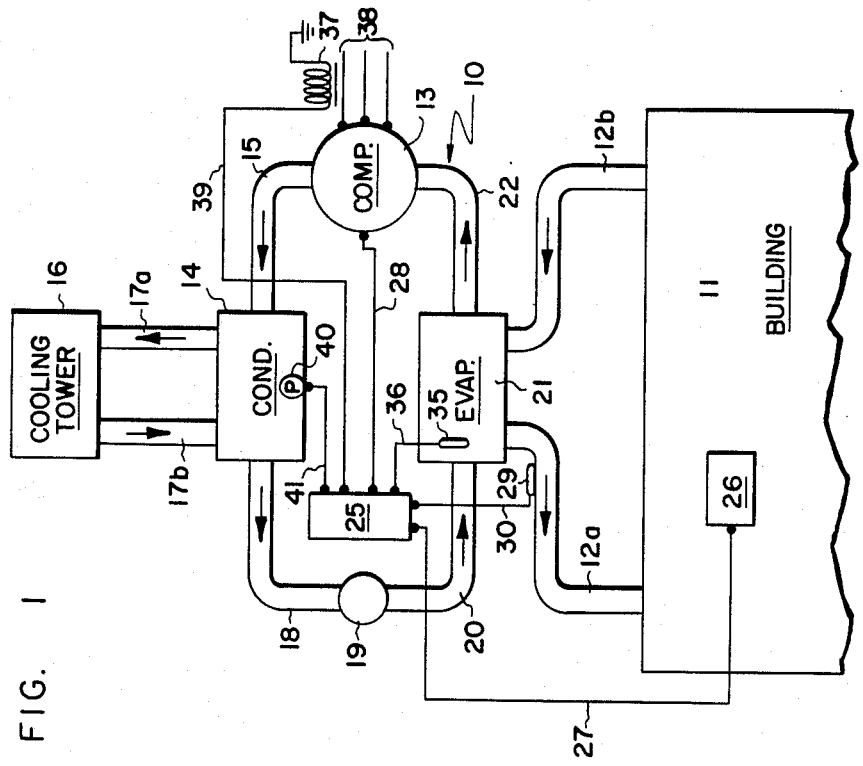
FIG. 1 is a block diagram of a liquid chiller air conditioning system in which the capacity is modulated using the subject invention.

Referring to FIG. 1, a liquid chiller system controlled by the subject invention is generally denoted by reference numeral 10. Chiller system 10 is used for cooling one or more comfort zones 11 in a building by providing a chilled fluid (a liquid in the preferred embodiment) via supply line 12a, and after the chilled fluid has been used to cool air circulated into the comfort zones 11, returning the fluid to the chiller through line 12b.

Chiller system 10 includes a centrifugal compressor 13 that is used to compress a refrigerant fluid, and a condenser 14 to which the compressed refrigerant fluid is supplied via line 15. In condenser 14, the compressed refrigerant fluid is condensed into a liquid by heat exchange with water that flows to and from a cooling tower 16 via lines 17a and 17b, respectively. The condensed refrigerant fluid flows through line 18 to an expansion device 19 and then through line 20 into evaporator 21 where the expanding refrigerant is vaporized in heat exchange with the liquid used to cool comfort zones 11 in the building. The vaporized refrigerant fluid thereafter returns to compressor 13 via line 22 to repeat the refrigerant cycle.

Operation of chiller system 10 is generally controlled by unit controller 25 which includes the capacity modulation control of the present invention. Unit control 25 may optionally be connected to a building automation system controller 26 via data and control lines 27 if it is desired to incorporate the control of chiller system 10 into an overall building control strategy. It must be emphasized, however, that building automation system controller 26 is not required, since unit controller 25 is capable of controlling the chiller system 10 by itself. Unit control 25 performs several functions, however, only those related to the subject invention are herein discussed.

Using signals passed over control line 28, controller 25 energizes or de-energizes centrifugal compressor 13 and varies the chiller capacity. It is connected to several sensors which permit capacity to be modulated as a function of the variables to which the sensors respond. These sensors include a leaving chilled liquid temperature sensor 29 connected via line 30 to unit control 25, an evaporator refrigerant temperature sensor 35 connected via line 36, a supply current sensor (transformer) 37 used to monitor the current supplied to the centrifugal compressor drive motor (not shown) on the three-phase power supply leads 38, and connected to the unit controller 25 by lead 39, and a condenser pressure sensor 40 connected to unit controller 25 by lead 41.

Figure 2:
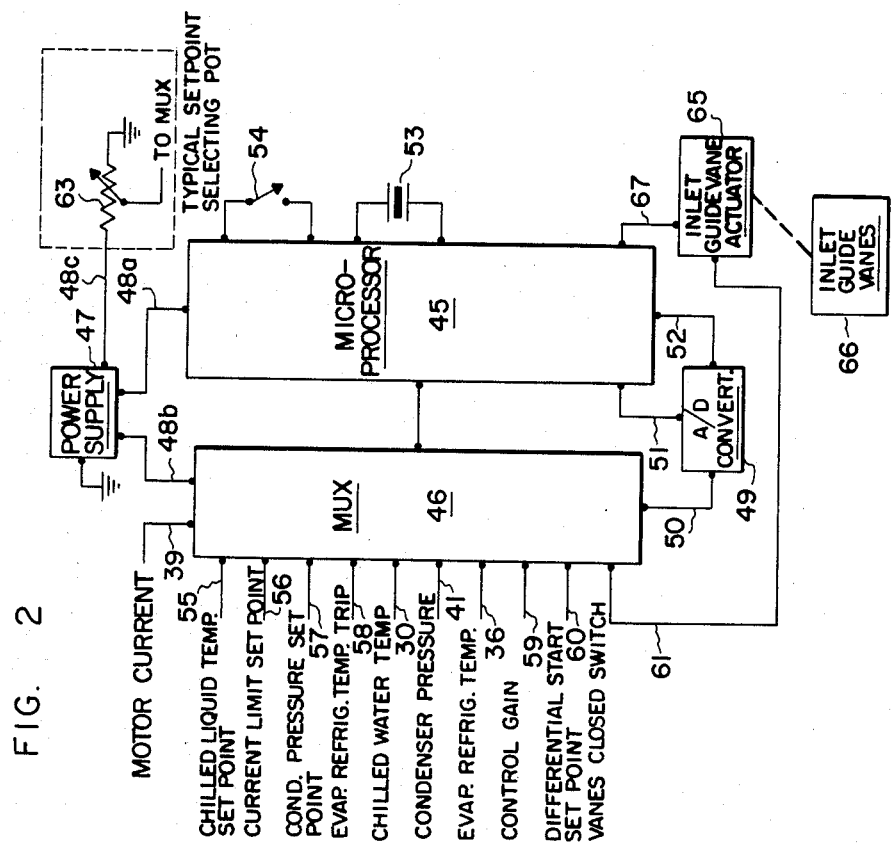
FIG. 2 is a schematic block diagram of the control means.

Turning now to FIG. 2, a block diagram shows that the unit controller 25 includes a microprocessor 45 and a multiplexer 46. Both of these solid-state devices are energized by current supplied from power supply 47 over leads 48a and 48b, respectively. In addition, an analog-to-digital converter 49 is used to convert whichever of the analog signals is selected by multiplexer 46 and input into A-D converter 49 via lead 50 into a digital data stream which is output to microprocessor 45 by the A-D converter over data line 51. A second lead 52 connects A-D converter 49 with microprocessor 45 and is used to control the A-D conversion process. In the preferred embodiment, A-D converter 49 comprises a conventional R-2R resistor network as is well known in the art. Other types of A-D converters could be used equally well in this application.

A number of analog signals are input to multiplexer 46 as follows. Lead 39 carries analog signal proportional to the centrifugal compressor motor current flowing in power leads 38; lead 55 provides an input representing a voltage level developed across a variable potentiometer which the user adjusts to the chilled water setpoint. The current limit setpoint is similarly selected by adjusting a variable pot; the resulting analog signal is input to multiplexer 46 via lead 56 as are analog signals representing the condenser pressure setpoint on lead 57, the evaporator refrigerant temperature setpoint on lead 58, the control gain setting on lead 59 and a user-selected variable referred to as a differential start setpoint on lead 60. In addition, analog signals representing chilled water temperature, evaporator refrigerant temperature, and condenser pressure are input on leads 30, 36, and 41, respectively.

One other signal processed by multiplexer 46 is input over lead 61 from the inlet guide vane actuator 65. This signal indicates when the inlet guide vanes are fully closed. Inlet guide vane actuator block 65 includes a bi-directional motor connected to move the inlet guide vanes between their fully opened and fully closed positions by incremental changes, as determined by microprocessor 45 according to the control algorithm. Inlet guide vanes 66 are otherwise conventional, and are well known in the prior art as an efficient means of modulating centrifugal compressor capacity. Inlet guide vane actuator block 65 also includes logic level switched AC line voltage control components (e.g., triacs) which are connected to microprocessor 45 by a control signal line 67.

A typical setpoint selecting potentiometer 63 is shown in FIG. 2 connected between power supply 47 and ground potential via lead 48c. A pot 63 is provided for each setpoint or limit setting. By adjusting an appropriate one of the pots 63, the operator selects an analog voltage representing one of the setpoints discussed above.

Microprocessor 45 includes random-access memory (RAM) and read-only memory (ROM). The ROM stores the program which is used to control the operation of chiller system 10 in binary format and includes the program of the subject invention. RAM is used to store variableperation of chiller system 10 in binary format and includes the program of the subject invention. RAM is used to store variables and data used by the program in implementing the algorithm for control of the chiller. Since the schematic of microprocessor controls of the type generally described hereinabove is well known in the prior art, it is not necessary to provide details of the circuit. The program stored in ROM, the functions that program performs, and the physical parameters sensed and used to perform those functions are what differentiate this embodiment of the subject invention from other known microprocessor chiller controls.

Figure 3:
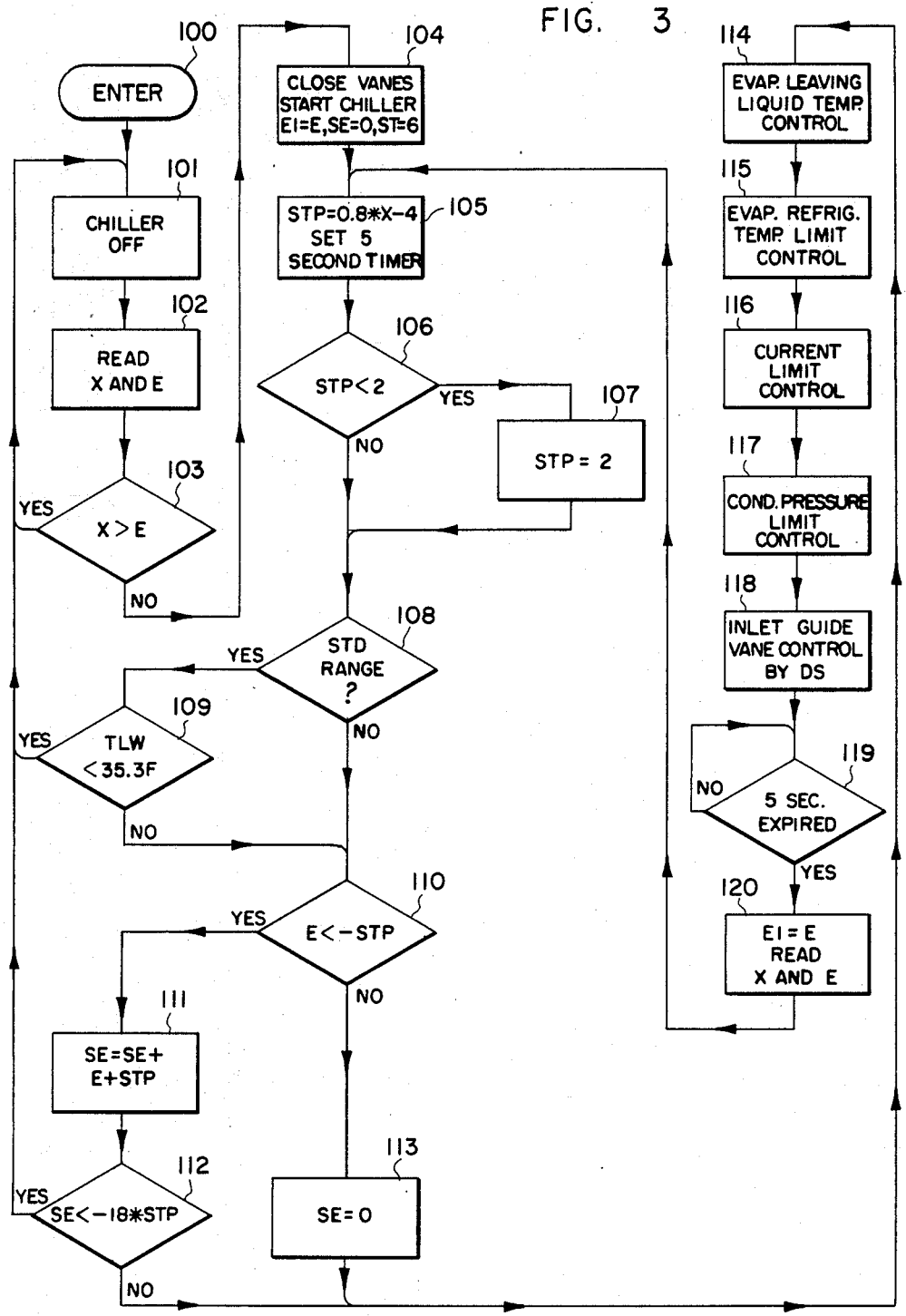
FIG. 3 is a flow chart disclosing the overall capacity control logic.

The overall chiller control algorithm is shown in the flow chart of FIG. 3. The program starts at block 100, followed by instruction 101 which insures that the chiller (compressor 13) is off. Instruction block 102 impliedly includes several operations. In it, micrprocessor 45 instructs multiplexer 46 to select the chilled fluid temperature setpoint signal, i.e., the analog value representing chilled fluid temperature, and the differential start setpoint signal. Using the digital values equivalent to these analog signals (as provided by A-D convertor 49), microprocessor 45 calculates an initial deviation of the chilled fluid temperature from the setpoint referred to in the flow chart of FIG. 3 as variable "E" or error, and assigns the digital value corresponding to the differential start setpoint to variable "X". Instruction block 103 then determines if the differential start temperature exceeds the chilled fluid temperature error. If so, the program returns to block 101 in which the chiller is turned off (if not already off). Otherwise, microprocessor 45 causes the inlet guide vane actuator 65 to close inlet guide vanes 66 completely, starts the compressor 13, and initializes certain variables, setting E1 equal to the initial error E, SE equal to 0, and ST equal to 6. The significance of these variables will become apparent in the following discussion.

In the preferred embodiment it is generally recommended that the user select a value for the differential start setpoint equal to approximately 50% of the design capacity of the chiller in degrees F. For example, if the chiller is designed to produce a 10° F. drop in the temperature of the fluid chilled by evaporator 21 at full capacity, the differential start setpoint X would be set to 5° F. Other values may be used for X, depending on the characteristics of the chiller system. The value selected for X is used in the control algorithm first to determine whether the chiller will initially be turned on, and in block 105, is used in the calculation of a variable STP. The variable STP is calculated according to the equation: $STP = 0.8*X - 4$. Block 105 also causes a five-second timer to be started internally within microprocessor 45. The five-second interval is determined by reference to a crystal time base 53 connected to microprocessor 45; a counter accumulates clock pulses in an internal register of the microprocessor until the count equals five seconds.

If the calculated value of STP is less than 2, instruction blocks 106 and 107 establish a lower limit, setting STP equal to 2. For example, assuming that X were equal to 4, the value of STP computed according to the equation in block 105 would be $-0.8$. Thus, following the program logic in blocks 106 and 107 the value of STP would be set to 2.

Referring briefly back to FIG. 2, a chilled fluid temperature setpoint range select switch 54 is provided on unit control 25 to permit the user to select either an extended range or the standard range for the chilled fluid temperature setpoint. In the standard range, the chiller water temperature setpoint must be set between the limits 37° F. and 60° F. If an ethylene-glycol solution is used as the chilled fluid instead of water the operator may select an extended range from 20° F. to 70° F. for the chilled fluid setpoint by closing switch 54. Instruction block 108 checks the status of switch 54 to determine if the standard range is selected, and if it is, checks the temperature of the leaving water from the evaporator at sensor 29 to determine if it is less than 35.3° F. If so, the program reverts to block 101 and turns the chiller off, providing additional freeze protection; otherwise it proceeds to instruction block 110 which checks whether the error E is less than $-STP$. Instruction 110 also is reached if there is a negative response to inquiry 108. This condition might occur if chiller system 10 were very lightly loaded so that at minimum capacity, the temperature of the chilled fluid dropped below the setpoint by more than the value STP. Under these conditions, instruction block 111 serves to integrate the variable SE over time until in instruction block 112, the value of SE becomes less than −18*STP. Should this occur, instruction block 101 turns the chiller off. If during successive passes through the program logic, the error E is greater than −STP, the value of SE is reset to 0 in instruction block 113. If the result in instruction block 112 is negative or after completing instruction block 113, the program continues to block 114 which is a subroutine entitled, "Evaporator Leaving Water Temperature Control."

Figure 4:
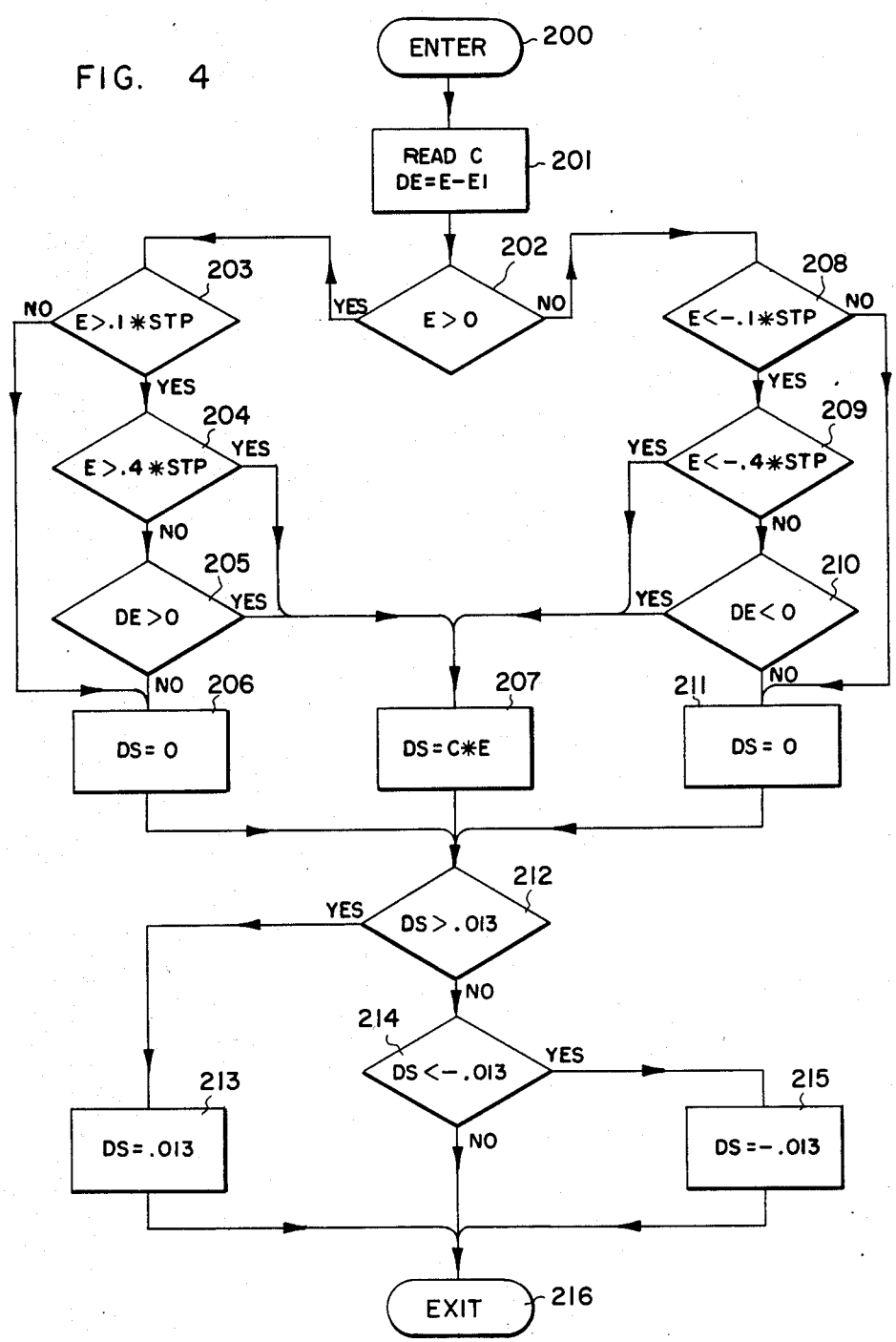
FIG. 4 is a flow chart disclosing the evaporator leaving water temperature control logic used to modulate the chiller inlet guide vanes to condition the chilled fluid to a setpoint temperature.

FIG. 4 is a flow chart for the subroutine dealing with control of the evaporator leaving liquid (chilled fluid) temperature called by block 114. The subroutine starts at block 200 and proceeds to block 201 wherein microprocessor 45 causes multiplexer 46 to select the control gain setting signal on lead 59 for A-D conversion and assigns the resulting digital value to a variable "C". In this instruction, microprocessor 45 also calculates a change in chilled fluid error by taking the difference between the previous and present values of the error E and assigns that change to a variable "DE". The following instruction block 202 checks to see if the present error is positive, i.e., greater than 0, and if so, diverts program logic to determine if the error exceeds 0.1*STP in instruction block 203. If the answer is affirmative, instruction block 204 checks to see if the error exceeds 0.4*STP and if not, instruction 205 determines if the change in error DE is greater than 0. A negative response to either inquiry 203 or 205 causes the program logic to go to instruction block 206 wherein the variable "DS" (indicating the relative change in the inlet guide vane position) is set equal to 0. An affirmative response to inquiries 204 and 205 causes program logic to proceed to instruction block 207 which sets the variable DS equal to the gain setting times the error, i.e., C*E.

Referring back to instruction block 202, if the error is equal to or less than 0, instruction block 208 next checks to see if the error is less than −0.1*STP. If so, block 209 determines if the error is less than −0.4*STP. A negative response to this inquiry causes a determination of whether the change in error DE is less than 0 in instruction block 210. A negative response to inquiries 208 and 210 causes the variable DS to be set equal to 0 in instruction block 211. Affirmative responses to the inquiries of 209 and 210 lead to instruction block 207 where, as previously noted, the variable DS is set equal to the product of the gain setting C, and the error E.

It should be apparent from the symmetrical appearance of the flow chart in FIG. 4, that either a positive or negative error can result in the same magnitude of change in the inlet guide vane position, DS, (although in opposite directions) and that the value associated with this change depends upon the relative absolute magnitude of the error. Regardless of which value for DS is selected, i.e., 0 or the product of C*E, program logic thereafter leads to inquiry 212 which determines whether DS is greater than 0.013. If it is, DS is set equal to 0.013 in instruction block 213, thereby defining an upper limit for the relative change in inlet guide vane position. Otherwise, instruction block 214 determines whether DS is less than −0.013 and if so, sets DS equal to −0.013 in instruction block 215, establishing a lower limit for the negative value of DS. Block 216 returns the program back to instruction block 115 on the main control logic as shown in FIG. 3.

Figure 5:
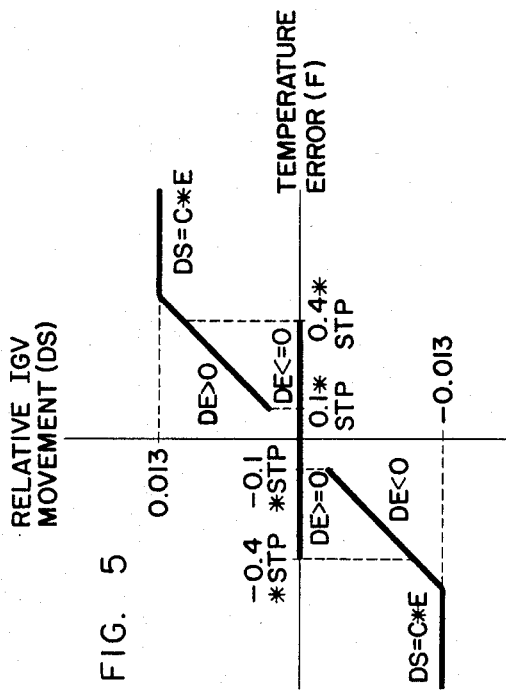
FIG. 5 is a graph illustrating inlet guide vane movement and fluid temperature error relative to the first and second deadbands.

Turning to FIG. 5, modulation of the compressor inlet guide vanes to maintain the leaving water fluid at the setpoint temperature is graphically illustrated. It will be apparent that the change in relative inlet guide vane movement never exceeds ±0.013, i.e., ±1.3% change in the inlet guide vane position for each five-second cycle of the program. Furthermore, if the temperature error E is between −0.1*STP and 0.1*STP, or, if: (a) the change in error DE is less than or equal to 0 when the error is between 0.1*STP and 0.4*STP; or (b) if the change in error is DE greater than or equal to 0 when the error is between −0.1*STP and −0.4*STP, then the relative inlet guide vane movement DS is set equal to 0. For a positive error, when the change in error is also positive, i.e., increasing, the relative inlet guide vane movement DS is set equal to the gain setting C times the error E. Likewise, when the error is negative (and less than minus 0.1*STP) and the change in error DE is negative, i.e., increasing in a negative direction, DS is likewise set equal to C*E.

In instruction block 115 of FIG. 3, the evaporator refrigerant temperature limit control subroutine is initiated. The logic for this subroutine is disclosed in a flow chart in FIG. 6, starting with instruction 300. Instruction 301 sets the variable "ET0" equal to the previous value read for the evaporator refrigerant temperature "ET," and causes multiplexer 46 to select the current analog input representing the evaporator refrigerant temperature and the analog input representing the evaporator refrigerant temperature "trip" setpoint. An offset limit "ET1" is calculated as trip+2° F. Those values are stored digitally within the microprocessor RAM for use by the algorithm. Instruction 321 determines the status of switch 54 and if the chiller system is running with a chilled fluid setpoint within the standard range, the program proceeds with inquiry 322. If the trip setpoint is less than 30° F., the program recomputes $ET1 = -trip + 1.5°$ F. This is necessary since less margin before freeze-up is available if water is being used as the chilled fluid and the evaporator refrigerant trip temperature is set more than two degrees below the temperature at which water freezes.

Following instruction 323, or if the inquiry at 321 indicates that the system is in extended range, or if in inquiry 322, the trip temperature is equal/greater than 30° F., the program proceeds to instruction 302. In instruction block 302, it is determined whether the difference between the present evaporator refrigerant temperature ET and the previous such temperature is greater than or equal to −0.375 and is so, instruction block 303 determines whether the current value for ET is greater than or equal to ET1+4° F. An affirmative response to that inquiry causes instruction 304 to return to the main control algorithm instruction block 116.

Returning to instruction 302, if the difference between the present evaporator refrigerant temperature and the previous value is less than −0.375, a variable "DS4" is set equal to: 0.01244*(ET−ET0+1.4375) in instruction block 305. Thereafter, instruction block 306 determines whether the relative change in inlet guide vane movement DS determinn block 305. Thereafter, instruction block 306 determines whether the relative change in inlet guide vane movement DS determined in the subroutine under instruction 114 is greater than the variable DS4. If it is, instruction 307 sets DS equal to the value of DS4. Program logic then proceeds to instruction block 303 as noted above.

If the inquiry in instruction 303 indicates that the evaporator refrigerant temperature is less than the setpoint ET1+4° F., then inquiry 308 determines whether the evaporator refrigerant temperature ET is less than or equal to a predefined trip temperature. If it is, a variable "DS1" is set equal to −0.124 in instruction 309, and in instruction 310 the variable ST is set equal to its previous value minus the difference between the trip temperature and the evaporator refrigerant temperature ET. On successive cycles through instruction block 310, the value ST is time integrated until in inquiry 311, if the value of ST is less than 0, the algorithm jumps to instruction block 101 of the main program where the chiller is turned off. The purpose of computing the time integral of ST and testing to determine when ST is less than 0 is to react to a condition in which the outdoor ambient air temperature is relatively cool, but because the chiller has been deenergized for an extended period of time, the fluid temperature has risen and the cooling load initially exceeds rated capacity of the chiller. Under these conditions the evaporator refrigerant temperature may fall rapidly once chiller system 10 is energized. By computing the time integral for ST, the control allows time for the chilled fluid to be cooled, but turns compressor 13 off before the circulating chilled fluid starts to freeze if the refrigerant temperature remains below the trip value.

Referring back to inquiry 308, if the evaporator refrigerant temperature ET is greater than the trip temperature, ST is reset to 6 in instruction 313, and inquiry 314 determines whether the value of ET is less than or equal to the evaporator refrigerant setpoint temperature −0.3° F. If so, instruction 315 sets DS1 equal to 0.005 times the difference between the evaporator refrigerant temperature and the offset limit i.e., 0.005*(ET−ET1). If the result of inquiry 314 is otherwise, inquiry 316 determines if the value of ET is greater than ET1+0.6°. If so, the variable DS1 is set equal to 0.0006*(ET−ET1+1.5) in instruction 317. Otherwise, DS1 is set equal to 0 in instruction block 318. Following instruction block 311, 315, 317, or 318, inquiry 319 determines whether the current value for DS (relative inlet guide vane movement) is greater than the variable DS1. If it is, instruction 320 sets DS equal to DS1 and then exits the subroutine at instruction 304.

Figure 6:
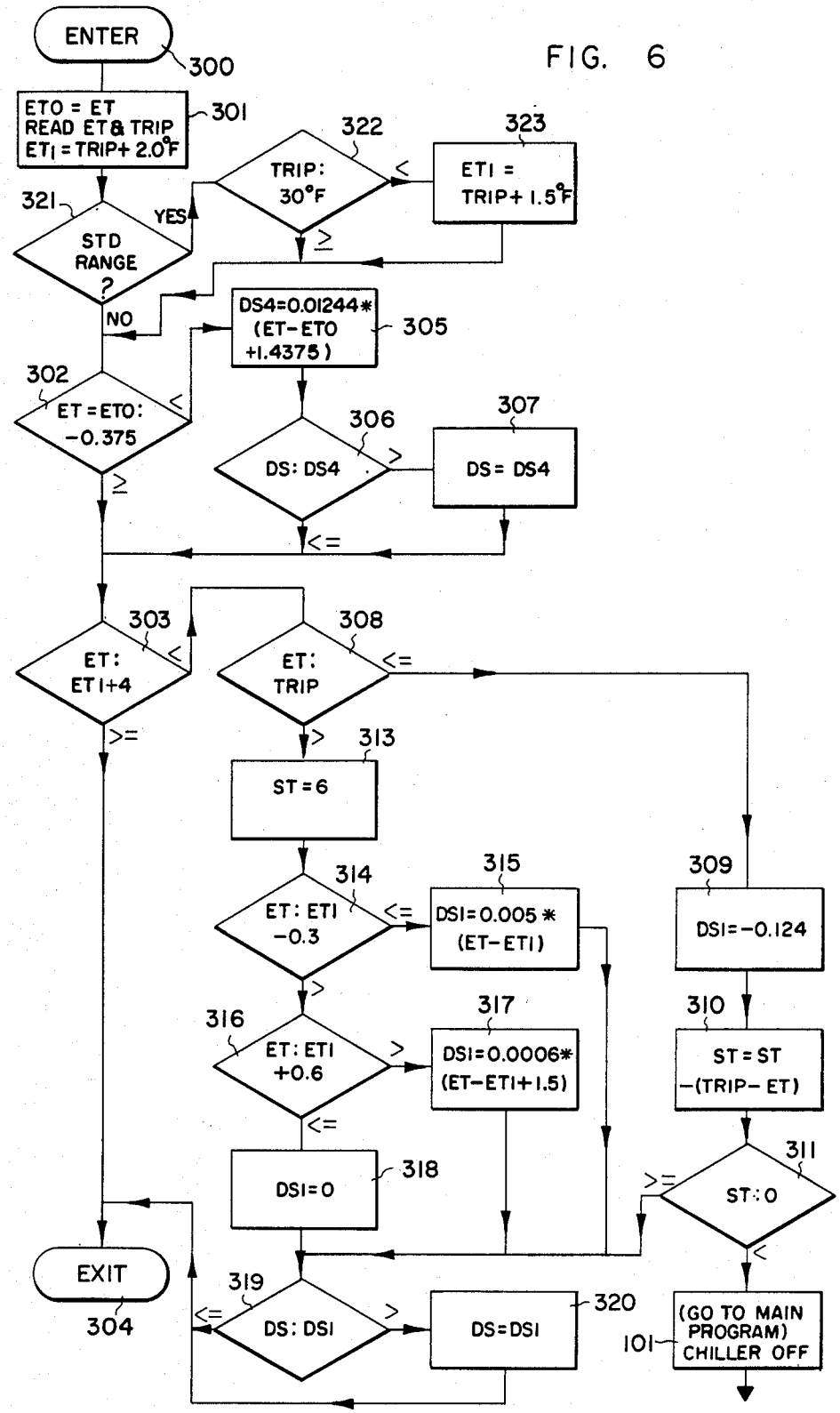
FIG. 6 is a flow chart disclosing the evaporator refrigerant temperature limit control logic.
Figure 8:
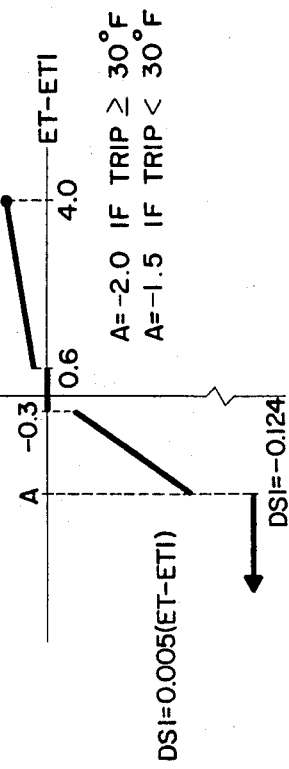
FIG. 8 is a graph illustrating inlet guide vane movement as a function of the error of the chilled fluid temperature during the evaporator refrigerant temperature limit control.
Figure 7:
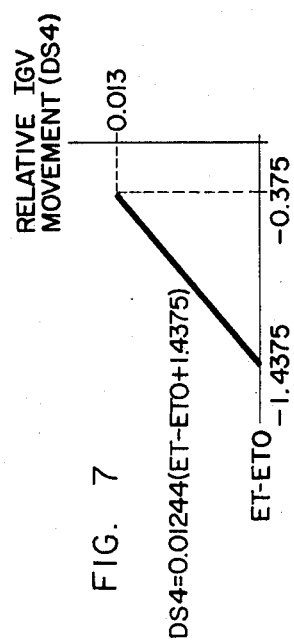
FIG. 7 is a graph illustrating inlet guide vane movement as a function of the change in the chilled fluid temperature during the evaporator refrigerant temperature limit control.

It will be apparent from reviewing FIG. 6, that upon exiting at instruction 304, the variable DS is equal to the algebraic minimum of the values DS4, DS1, and the original DS (at entry block 300), depending upon the relationship of the evaporator refrigerant temperature and the setpoint. The control algorithm for modulating chiller capacity as the evaporator refrigerant temperature approaches or is near its setpoint and trip temperatures is illustrated in FIGS. 7 and 8. In FIG. 7, DS4 is computed as a function of the difference between the present evaporator refrigerant temperature and its previous value when that difference falls between −0.375 and −1.4375. In addition, the maximum value of DS4 is effectively limited to 0.013, since DS4 can only replace DS if it is less than DS, as provided in instruction blocks 306 and 307. If the evaporator refrigerant temperature ET minus its offset limit ET1 is less than 4° F., a value DS1 is computed according to four possible equations. If ET−ET1 is between 0.6 and 4, DS1 equals 0.0006*(ET−ET1+1.5). If ET−ET1 is between −0.3 and 0.6, DS1 equals 0. If ET−ET1 is between AA and −0.3, (where AA is equal to minus the value added to the trip setpoint to calculate ET1), DS1 equals 0.005*(ET−ET1). And finally, if ET−ET1 is less than AA then DS1 is equal to −0.124. Again, it is important to note that upon exiting at instruction 304, program logic preserves the algebraic minimum inlet guide vane movement calculated in the preceding control algorithm, as DS.

Figure 9:
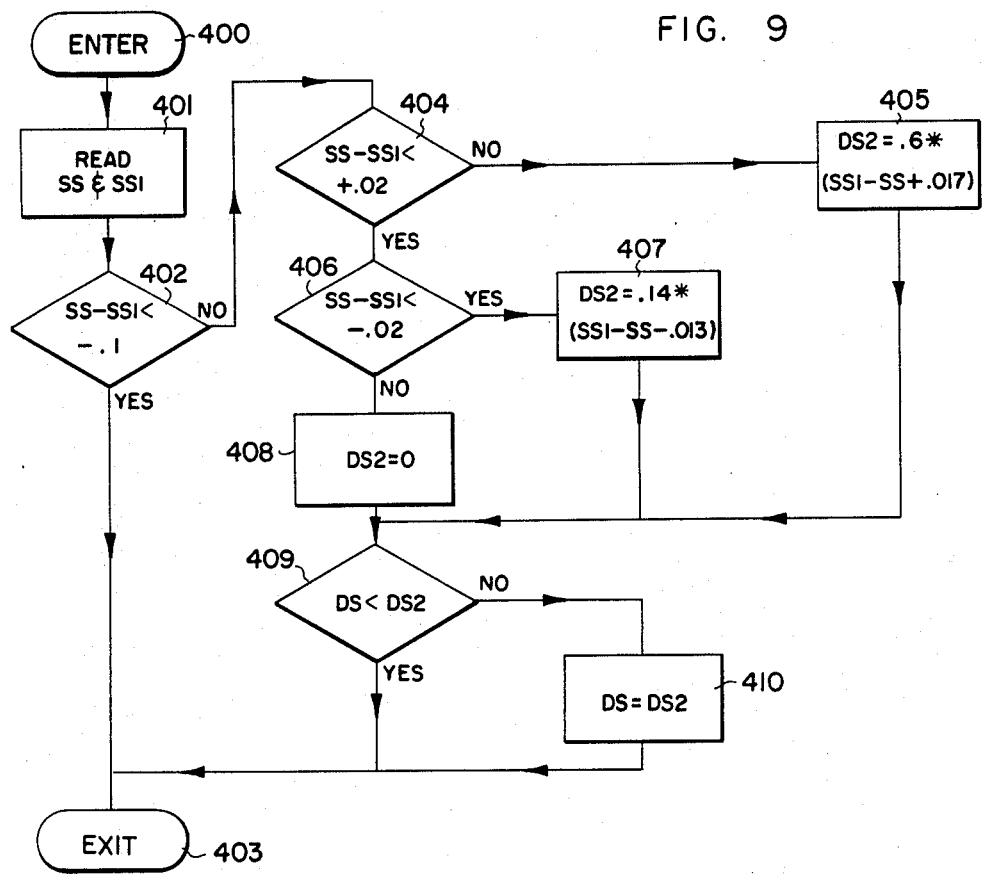
FIG. 9 is a flow chart showing the current limit control logic.

Instruction block 116 identifies the line current limit control as the next subroutine used by program logic. The algorithm for this subroutine is shown in FIG. 9 as a flow chart which starts at instruction block 400. Following entry at this point, instruction 401 causes multiplexer 46 to select the analog line current signal and the current limit setpoint signals, converts them to digital values using the A-D convertor 49 and stores these values in microprocessor RAM as variables "SS" and "SS1", respectively. Inquiry 402 determines whether the difference between the measured current and the setpoint for current limit is less than −0.1. If it is, the current is not sufficiently close to its setpoint limit to justify modulation of capacity, and control logic exits at instruction block 403. Otherwise, inquiry 404 determines whether the difference between the current and its setpoint is less than 0.02. If not, a variable "DS2" is set equal to 0.6*(SS1−SS+0.017) in instruction block 405. Otherwise, inquiry 406 determines if the difference between the current and its setpoint is less than −0.02, and if so, instruction 407 sets DS2 equal to 0.14*(SS1−SS−0.013). A negative response to inquiry 406 causes instruction 408 to set DS2 equal to 0.

Following instructions 405, 407, 408, inquiry 409 determines whether DS is less than DS2, and if not, instruction 410 sets DS equal to DS2. Thus, the current control limit algorithm exits at 403 with the value DS equal to the algebraic minimum of the value DS previously calculated at entry block 400 and DS2.

Figure 10:
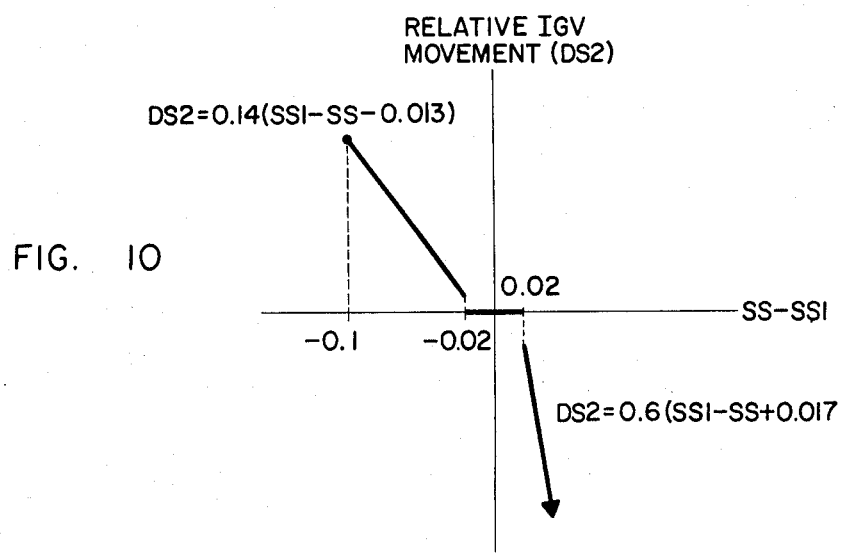
FIG. 10 is a graph illustrating the inlet guide vane movement as a function of the chilled fluid error for the current limit control.
Figure 11:
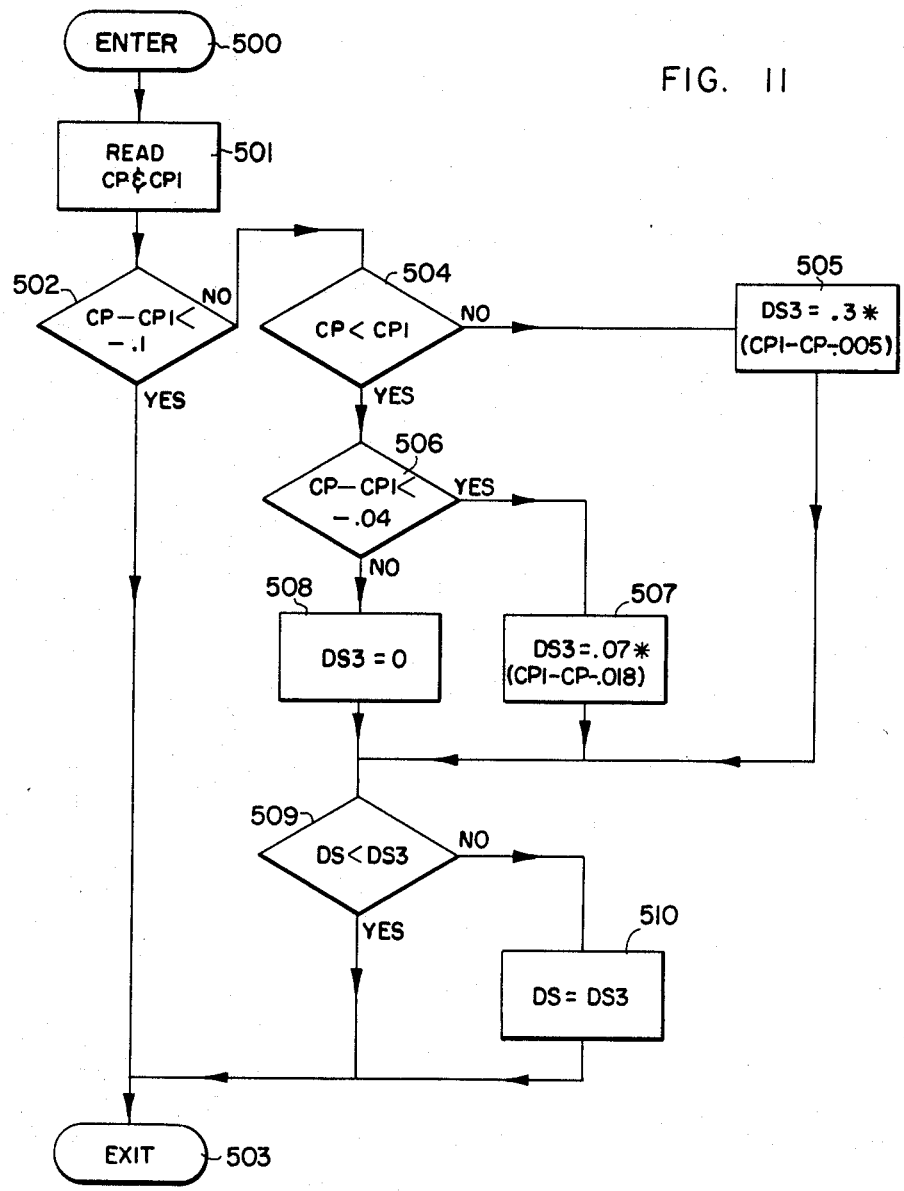
FIG. 11 is a flow chart showing the condenser pressure control logic.

FIG. 10 illustrates how the variable DS2 is calculated according to two different functions of (SS1−SS), depending upon whether the value (SS−SS1) is greater than 0.02 or between −0.1 and −0.02. A deadband wherein DS2 is set equal to 0 extends over the range wherein (SS1−SS) equals from −0.02 to 0.02.

Following instruction block 116, control logic in FIG. 3 proceeds to the subroutine entitled, "Condenser Pressure Limit Control," instruction block 117. Program logic for this subroutine begins at entry block 500. Instruction block 501 causes multiplexer 46 to select the condenser pressure analog signal and the condenser pressure setpoint limit signal for A-D conversion, and storage in RAM by microprocessor 45. The condenser pressure normalized on a scale of zero to one and is stored as the variable "CP", while the setpoint for this operating parameter limit is also normalized and stored as "CP1". Inquiry 502 determines if the difference between the normalized condenser pressure and its limit is less than −0.1, and if so, program logic exits this subroutine at instruction block 503, since the condenser pressure is sufficiently below the limit not to cause any problem. Otherwise, inquiry 504 determines whether the normalized condenser pressure is less than the setpoint, and if not, instruction 505 sets a variable "DS3" equal to 0.3*(CP1−CP−0.005). If the result of inquiry 504 is affirmative, inquiry 506 determines if the difference between the normalized condenser pressure and its limit is less than −0.04. If it is, variable DS3 is set equal to 0.07*(CP1−CP−0.018) in instruction block 507. Otherwise, instruction 508 sets DS3 equal to 0. Following instructions 505, 507, or 508, inquiry 509 checks to determine if DS is less than DS3 and if not, instruction 510 sets DS equal to DS3. Following either instructions 509 or 510, control logic exits at 503 returning to instruction block 118 on FIG. 3.

Figure 12:
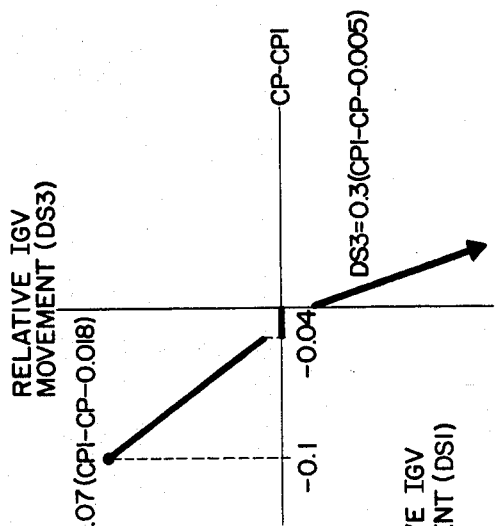
FIG. 12 is a graph illustrating the inlet guide vane movement as a function of the chilled fluid error for the condenser pressure control.

The modulation of chiller capacity in terms of relative inlet guide vane movement related to normalized condenser pressure (DS3) is shown in FIG. 12. Again, it will be apparent that DS3 is equal to a first function of the condenser pressure and its setpoint limit if the value of (CP−CP1) is greater than 0, and to a second function thereof if the value of CP minus CP1 lies in the range of −0.1 to −0.04. The deadband in which DS3 is set equal to 0 extends over the range (CP−CP1) equals −0.04 to 0. Once again, DS is set equal to the algebraic minimum of its previous value upon entry to the algorithm at block 500 and the value DS3 calculated by the condenser pressure limit control algorithm.

Instruction block 118 on FIG. 3 provides for microprocessor 45 to cause the inlet guide vanes to be adjusted by the amount DS calculated in the preceding subroutines, i.e., its value at instruction 503. This adjustment is accomplished by energizing the inlet guide vane actuator 65 so that it forces the inlet guide vanes to open or close by the amount DS calculated as described hereinabove. Inquiry 119 in FIG. 3 checks to determine whether the five-second timer has elapsed, and if not, loops through inquiry 119 until the timer condition is met. At that point, instruction 120 assigns the current value of the chilled fluid temperature error E to the variable E1, and causes multiplexer 46 to successively select the differential start setpoint, the chiller water temperature setpoint, and the current chilled water temperature analog signals A-D conversion and microprocessor 45 to calculate the error E. Thereafter, program logic returns to instruction block 105 to again cycle through the program once each five-second interval.

Each of the algorithms defined by instruction blocks 115, 116 and 117, have the potential to override the evaporator leaving liquid temperature control of subroutine 114 as necessary to keep the chiller system 10 operating as one of the operating parameters (i.e., evaporator refrigerant temperature, current, and condenser pressure) approaches a limit beyond which it is likely the system would have to shut down to avoid a catastrophic system failure. This feature enables chiller system 10 to continue to provide cooling to comfort zones 11 even when the desired evaporator leaving liquid temperature setpoint cannot be achieved, rather than continuing to operate at full capacity to a point where the system would shut down completely.

A further benefit of this invention resides in the control of evaporator leaving liquid temperature. Normally, the capacity of chiller system 10 is modulated through adjustment of the inlet guide vanes as a function of the temperature error and gain setting, around one of two deadbands that depend upon whether that error is decreasing or increasing. When the temperature error is decreasing, the relative inlet guide vane movement DS remains unchanged in the relatively wider deadband, that extends from −4.*STP to 0.4*STP, providing more stable control as the chilled fluid temperature approaches its setpoint. Alternatively, when the chilled liquid temperature error is increasing, a narrower deadband from −0.1*STP to 0.1*STP is used to control capacity to minimize the magnitude of the temperature error. This control scheme both reduces unnecessary change in chiller capacity and provides stable control of the chilled liquid temperature.

Although the preferred embodiment uses inlet guide vanes to vary the capacity of a centrifugal chiller, it will be apparent that other means of modulating the chiller capacity could equally well be used with the subject invention, as for example, a variable speed compressor drive motor. The basic contrl could also be used in a system wherein a heat transfer liquid is heated rather than chilled. In addition, the same control and method could be applied to a temperature conditioning system wherein the expanding or condensing refrigerant fluid is used directly to respectively cool or heat a gaseous fluid, such as air. These and other modifications to the preferred embodiment as disclosed hereinabove will be apparent to those skilled in the art within the scope of the claims that follow hereinbelow.

We claim:

1. In a temperature conditioning system for conditioning a fluid to a setpoint temperature, a control for modulating the capacity of the system when an operating parameter is near a limit associated with protective shutdown of the system to avoid catastrophic failure, said control comprising
   a. means for sensing the condition of the operating parameter;
   b. means for selecting the limit for the operating parameter; and
   c. control means, responsive to the sensing means and the selecting means, for determining the deviation of the operating parameter from its limit and for modulating the capacity of the system according to a first predefined function of the deviation if the deviation is greater than a deadband and according to a second predefined function of the deviation if the deviation is less than the deadband.

2. The control of claim 1 wherein the control means are further operative to modulate the capacity of the system to maintain the conditioned fluid near the setpoint temperature.

3. The control of claim 2 wherein the control means are operative to modulate the system capacity according to one of the first and second predefined functions rather than maintaining the conditioned fluid at the setpoint, if the deviation of the operating parameter from the limit is less than a first predetermined value.

4. The control of claim 3 wherein the temperature conditioning system includes a refrigerant condenser and the means for sensing comprise a pressure sensor for sensing the pressure of refrigerant fluid in the condenser.

5. The control of claim 3 wherein the means for sensing comprise a line current sensor for sensing the operating line current supplied to power the temperature conditioning system.

6. The control of claim 3 wherein the temperature conditioning system includes a refrigerant evaporator and the means for sensing comprise a temperature sensor for sensing the temperature of refrigerant fluid in the evaporator.

7. The control of claim 6 wherein the control means are further operative to modulate system capacity according to a predefined function of the change in evaporator refrigerant fluid temperature over time if:
   a. the deviation is greater than a second predefined value, and
   b. the change in system capacity determined according to said function of the change in refrigerant fluid temperature is less than any change required to condition the fluid to the setpoint temperature.

8. The control of claim 1 wherein the temperature conditioning system includes a centrifugal compressor with inlet guide vanes used to modulate compressor capacity.

9. The control of claim 8 wherein the control means modulate system capacity by adjustment of the inlet guide vanes at predefined intervals of time.

10. In a temperature conditioning system for conditioning a fluid to a setpoint temperature, a control for modulating the capacity of the system to maintain the temperature of the fluid at the setpoint unless an operating parameter is near a limit which would cause a protective shutdown of the system to avoid catastrophic failure and possible damage, said control comprising
   a. means for sensing the condition of the operating parameter;
   b. means for selecting the limit for the operating parameter; and
   c. control means responsive to the sensing means, for determining the deviation of the operating parameter from its limit, and if the deviation is within a predefined increment, modulating the capacity of the system as a function of the deviation rather than to maintain the fluid at its setpoint temperature.

11. In a temperature conditioning system for conditioning a fluid to a setpoint temperature, a method of controlling the capacity of the system when an operating parameter of the system is near a limit associated with a system protective shutdown to avoid catastrophic failure, said method comprising the steps of
   a. sensing the condition of the operating parameter;
   b. selecting the limit for the operating parameter;
   c. determining the deviation of the operating parameter from its limit, and
   d. modulating the capacity of the system according to a first predefined function of the deviation if the deviation is greater than a predefined deadband and according to a second predefined function of the deviation if the deviation is less than the deadband.

12. The method of claim 11 further comprising the step of modulating the capacity of the system to maintain the conditioned fluid near the setpoint temperature.

13. The method of claim 11 wherein the step of modulating the system capacity according to one of the first and second predefined functions takes priority over the step of maintaining the conditioned fluid at the setpoint, if the deviation of the operating parameter from the limit is less than a first predetermined value.

14. The method of claim 13 wherein the temperature conditioning system includes a refrigerant condenser and the operating parameter comprises the pressure of refrigerant fluid in the condenser.

15. The method of claim 13 wherein the operating parameter comprises the electrical line current supplied to power the temperature conditioning system.

16. The method of claim 13 wherein the temperature conditioning system includes a refrigerant evaporator and the operating parameter comprises the temperature of refrigerant fluid in the evaporator.

17. The method of claim 16 further comprising the step of determining the change of refrigerant fluid temperature in the evaporator over time.

18. The method of claim 17 further comprising the step of modulating system capacity according to a predefined function of the change in evaporator refrigerant fluid temperature if:
   a. the deviation is greater than a second predefined value, and
   b. the change in system capacity determined according to said function of the change in refrigerant fluid temperature is less than any change required to condition the fluid to the setpoint temperature.

19. The method of claim 1 wherein the temperature conditioning system includes a centrifugal compressor with inlet guide vanes used to modulate the compressor capacity.

20. The method of claim 19 wherein the step of modulating system capacity comprises the step of adjusting the inlet guide vanes at predefined intervals of time.

* * * * *

UNITED STATES PATENT AND TRADEMARK OFFICE
CERTIFICATE OF CORRECTION

PATENT NO. : 4,715,190

DATED : December 29, 1987

INVENTOR(S) : Doyoung Han and Merle A. Renaud

It is certified that error appears in the above-identified patent and that said Letters Patent is hereby corrected as shown below:

In the Specification:

Column 5, lines 48-50, delete the sentence "RAM is used to store variableperation of chiller system 10 in binary format and includes the program of the subject invention."

Column 6, line 50, "chiller" should be -- chilled --.

Column 8, line 48, "is" should be -- if --.

Column 8, lines 57-59, delete the sentence "Thereafter instruction block 306 determines whether the relative change in inlet guide vane movement DS determinn block 305."

Column 10, line 47, after "pressure" insert -- is --.

Column 11, line 27, "chiller" should be -- chilled --.

Column 12, line 3, "contrl" should be -- control --.

In the Claims:

Column 14, line 34, claim 19, "claim 1" should be -- claim 11 --.

Signed and Sealed this

Nineteenth Day of April, 1988

Attest:

DONALD J. QUIGG

*Attesting Officer*  *Commissioner of Patents and Trademarks*